United States Patent Office.

THOMAS RESTIEAUX, OF BOSTON, MASSACHUSETTS.

*Letters Patent No.* 63,749, *dated April* 9, 1867; *reissue No.* 4,020, *dated June* 7, 1870.

IMPROVEMENT IN DEODORIZING PETROLEUM.

The Schedule referred to in these Letters Patent and making part of the same

*To all whom it may concern:*

Be it known that I, THOMAS RESTIEAUX, of Boston, in the county of Suffolk and State of Massachusetts, have invented a new and improved Mode of Removing, Diminishing, or Changing the Odor of Petroleum, of which the following is a specification.

*Nature and Object of the Invention.*

The nature consists in subjecting the oil to the action of quicksilver, the quicksilver having been previously prepared by mixing or combining it with such chemicals as will leave it free to act upon the odor-bearing elements of the oil; the object being to so change or purify the oil that it will not give off disagreeable odors while burning.

*General Description.*

There is a variety of ways by which the quicksilver solution may be prepared, but the one I prefer may be described as follows:

The quicksilver, in a suitable vessel, is then covered with sulphuric acid, to which a small amount of nitric acid has been added, drop by drop, as the solution requires.

The mixture is allowed to stand until the quicksilver has been wholly or partly taken up by the acid; then it is dissolved in water, and in this condition is mixed with the oil, the whole being agitated until the mercury solution has had an opportunity to act sufficiently upon the oil; then, by allowing the mixture to stand, the quicksilver solution will settle and the oil may be drawn off.

To complete the process, the oil is thoroughly washed by pure water, or by any suitable alkaline solution.

In my experiments I have used nitric acid, hydrochloric acid, as well as a mixture of these two acids and sulphuric acid, and have been quite successful.

Other chemicals may be used in connection with the quicksilver, but the process first given is, I think, the best.

I claim as my invention—

The application of quicksilver to petroleum and any of the products of petroleum, as herein described, using for that purpose the aforesaid solution, or its equivalent, which will produce the intended effect.

THOS. RESTIEAUX.

Witnesses:

JAS. L. CONANT,

FRANKLIN PARKER.